(12) United States Patent
Kamiguchi et al.

(10) Patent No.: US 8,208,242 B2
(45) Date of Patent: Jun. 26, 2012

(54) ELECTRODE FOIL AND CAPACITOR USING THE SAME

(75) Inventors: Hiroki Kamiguchi, Osaka (JP); Akiyoshi Oshima, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/129,024

(22) PCT Filed: Oct. 5, 2010

(86) PCT No.: PCT/JP2010/005954
§ 371 (c)(1), (2), (4) Date: May 12, 2011

(87) PCT Pub. No.: WO2011/043059
PCT Pub. Date: Apr. 14, 2011

(65) Prior Publication Data
US 2011/0216470 A1 Sep. 8, 2011

(30) Foreign Application Priority Data
Oct. 9, 2009 (JP) ................................. 2009-234767

(51) Int. Cl.
*H01G 9/04* (2006.01)
(52) U.S. Cl. ........ 361/528; 361/516; 361/519; 361/523; 361/525; 361/529; 29/25.01; 29/25.03
(58) Field of Classification Search .................. 361/528, 361/516–519, 523, 529–530, 502–504, 509–512; 29/25.01, 25.03
See application file for complete search history.

(56) References Cited

U.S. PATENT DOCUMENTS

| | | | |
|---|---|---|---|
| 5,431,971 A | 7/1995 | Allegret et al. | |
| 6,226,173 B1 | 5/2001 | Welsch et al. | |
| 6,456,483 B1 | 9/2002 | Chiavarotti et al. | |
| 6,495,021 B2 | 12/2002 | Welsch et al. | |
| 6,795,297 B2 * | 9/2004 | Iwaida et al. | 361/502 |
| 6,853,537 B2 * | 2/2005 | Ishii | 361/512 |
| 6,887,617 B2 * | 5/2005 | Sato et al. | 429/128 |
| 6,914,769 B2 | 7/2005 | Welsch et al. | |
| 6,933,041 B2 | 8/2005 | Katsir et al. | |
| 7,460,357 B2 * | 12/2008 | Takeda et al. | 361/523 |
| 7,495,892 B2 * | 2/2009 | Saida et al. | 361/528 |

(Continued)

FOREIGN PATENT DOCUMENTS
EP 2009 653 A1 5/2007
(Continued)

OTHER PUBLICATIONS

International Search Report for PCT/JP2010/005954 (with English translation and written opinion), Dec. 21, 2010.
(Continued)

*Primary Examiner* — Nguyen T Ha
(74) *Attorney, Agent, or Firm* — RatnerPrestia

(57) ABSTRACT

An electrode foil includes a substrate made of metal and a rough layer disposed on a surface of the substrate and including plural fine metallic particles. The rough layer includes a lower layer, an intermediate layer which is disposed on the lower layer and is more distanced from the substrate than the lower layer is, and an upper layer which is disposed on the intermediate layer and is more distanced from the substrate than the intermediate layer is. The mode of diameters of fine particles in the intermediate layer is greater than the mode of diameters of the fine particles in the upper and lower layers. This electrode foil provides a capacitor having a small leakage current.

8 Claims, 10 Drawing Sheets

U.S. PATENT DOCUMENTS

| | | | |
|---|---|---|---|
| 7,551,424 B2 * | 6/2009 | Kuriyama | 361/528 |
| 7,709,082 B2 | 5/2010 | Katsir et al. | |
| 2010/0202102 A1 | 8/2010 | Aoyama et al. | |

FOREIGN PATENT DOCUMENTS

| | | | |
|---|---|---|---|
| JP | 1-183110 A | 7/1989 |
| JP | 3-196510 A | 8/1991 |
| JP | 6-267803 A | 9/1994 |
| JP | 8-107044 A | 4/1996 |
| JP | 2007-123816 A | 5/2007 |
| JP | 2008-10490 A | 1/2008 |
| JP | 2008-258404 A | 10/2008 |
| JP | 2008-288295 A | 11/2008 |
| JP | 2008-288296 A | 11/2008 |
| WO | WO 2009/060563 A1 | 5/2009 |
| WO | WO 2010/064359 A1 | 6/2010 |

OTHER PUBLICATIONS

International Search Report for PCT/JP2009/005942, Feb. 2, 2010.

* cited by examiner

| | Example of Embodiment | Comparative Example |
|---|---|---|
| Structure of Rough Layer | Four-Layer Structure | Single-Layer Structure |
| Capacitance of Electrode Foil | 95% | 100% |
| Crack Generating Rate | 0% | 50% |

ELECTRODE FOIL AND CAPACITOR USING THE SAME

This application is a U.S. national stage application of the PCT International Application No. PCT/JP2010/005954.

TECHNICAL FIELD

The present invention relates to an electrode foil and a capacitor including the electrode foil.

BACKGROUND ART

It has been demanded that some types of capacitors, solid electrolytic capacitors having low equivalent series resistance and adapted for use with CPUs in personal computers or aluminum electrolytic capacitors employed for smoothing in power circuits, have a small size and a large capacitance.

A solid electrolytic capacitor includes an electrode foil (anode) having a dielectric film disposed on a surface thereof, a solid electrolyte layer made of conductive polymer disposed on the dielectric film, and an cathode layer disposed on the solid electrolyte layer.

FIG. 11 is a schematic cross sectional view of a conventional electrode foil 1 disclosed in Patent Literature 1. The electrode foil 1 includes a substrate 2 made of valve metal foil, a rough layer 3 disposed on the substrate 2, and a dielectric film disposed on the rough layer 3. The substrate 2 and the rough layer 3 serve as a positive electrode of the solid electrolytic capacitor.

The rough layer 3 is formed by vapor deposition and composed of plural fine metallic particles 4 which are joined with one another and extending from the surface of the substrate 2. This structure provides the electrode foil 1 with a large surface area per unit size, accordingly providing the capacitor with a large capacitance.

The dielectric film is formed by anodizing the fine particles 4 in the rough layer 3 and coating the surface of the rough layer 3 with metal oxide.

The capacitor fabricated with the electrode foil 1 may have a leakage current increasing.

CITATION LIST

Patent Literature

Patent Literature 1: Japanese Patent Laid-Open Publication No. 2008-258404

SUMMARY OF THE INVENTION

An electrode foil includes a substrate made of metal and a rough layer disposed on a surface of the substrate and including plural fine metallic particles. The rough layer includes a lower layer, an intermediate layer which is disposed on the lower layer and is more distanced from the substrate than the lower layer is, and an upper layer which is disposed on the intermediate layer and is more distanced from the substrate than the intermediate layer is. The mode of diameters of fine particles in the intermediate layer is greater than the mode of diameters of the fine particles in the upper and lower layers.

This electrode foil provides a capacitor having a small leakage current.

DETAIL DESCRIPTION OF PREFERRED EMBODIMENTS

Exemplary Embodiment 1

Figure 1:
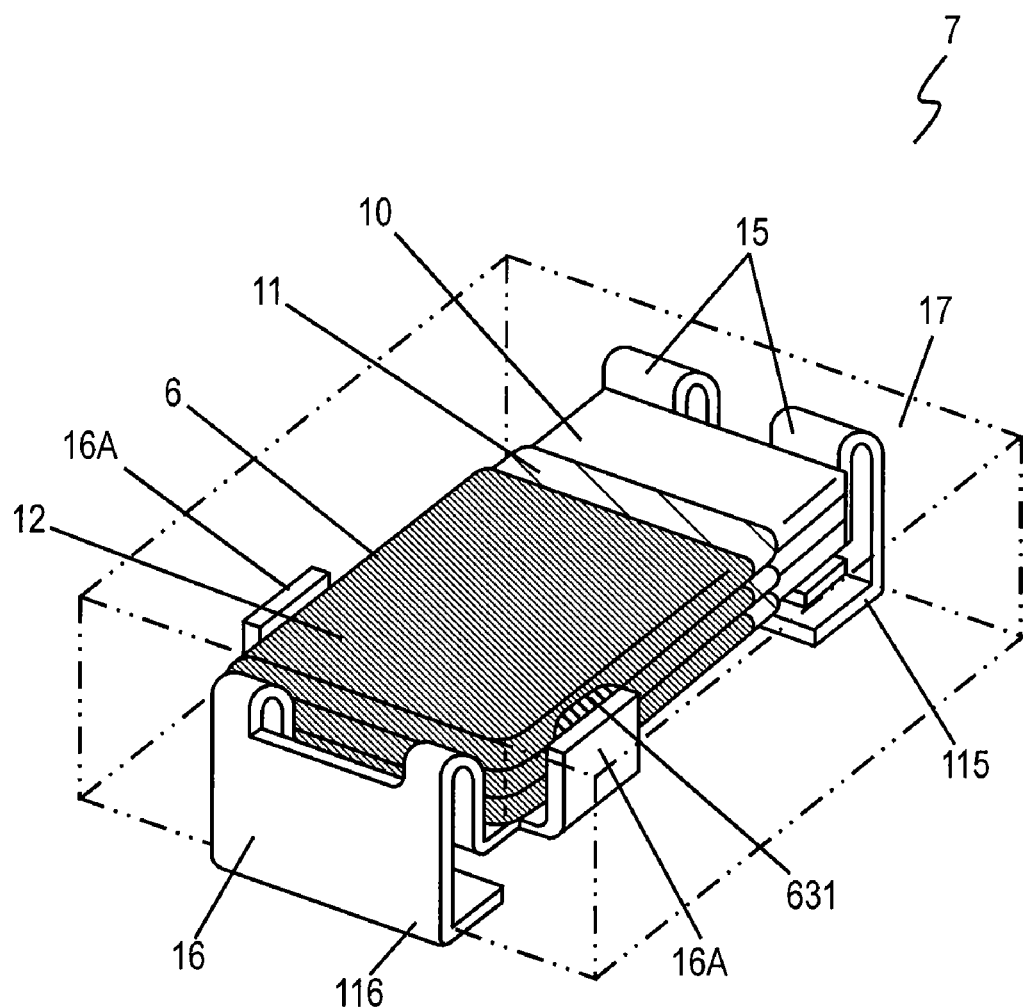
FIG. 1 is a perspective view of a capacitor according to Exemplary Embodiment 1 of the present invention.

FIG. 1 is a schematic view of a capacitor 7 according to Exemplary Embodiment 1 of the present invention. The capacitor 7 includes plural capacitor elements 6 which have a plate shape and are stacked. The capacitor element 6 includes an anode electrode 10 and a cathode electrode 12. The anode electrode 10 of each capacitor element 6 is joined by laser welding to the anode common terminal 15. The capacitor elements 6 are joined at cathode electrodes 12 thereof to a cathode common terminal 16. The cathode common terminal 16 has a mounting portion on which the capacitor elements 6 are placed and a pair of bent portions 16A which are formed by upwardly bending both sides of the mounting portion. A conductive adhesive 631 is applied for bonding the mounting portion of the cathode common terminal 16 to the cathode electrode 12 of the lowest capacitor element 6, bonding the bent portions 16A and the cathode electrode 12 of each capacitor element 6, and bonding the cathode electrodes 12 of any two adjacent capacitor elements 6.

The anode common terminal 15 and the cathode common terminal 16 together with the capacitor elements are entirely coated with a package resin 17 which is made of an electrically insulating resin material. The anode common terminal 15 and the cathode common terminal 16 have anode terminal end 115 and cathode terminal end 116 exposed from the package resin 17, respectively. The anode terminal end 115 and the cathode terminal end 116 are bent along the edges of the package resin 17 to be situated on a bottom surface of the package resin 17, thereby providing a surface mount type of the capacitor 7.

Figure 2A:
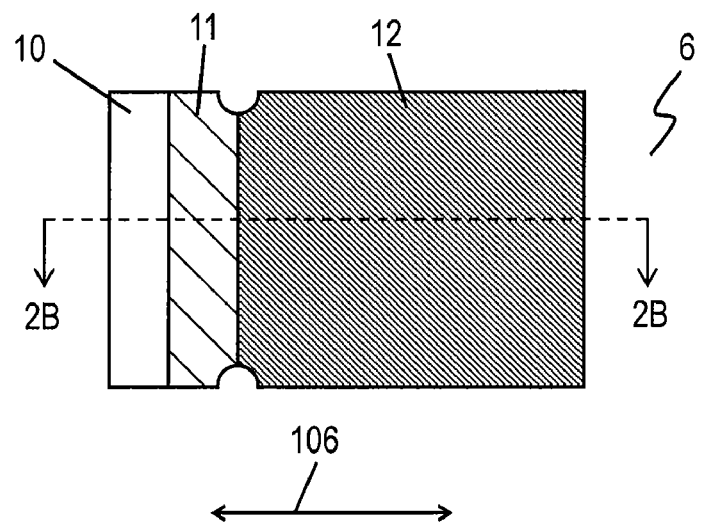
FIG. 2A is a plan view of a capacitor element of the capacitor according to Embodiment 1.
Figure 2B:
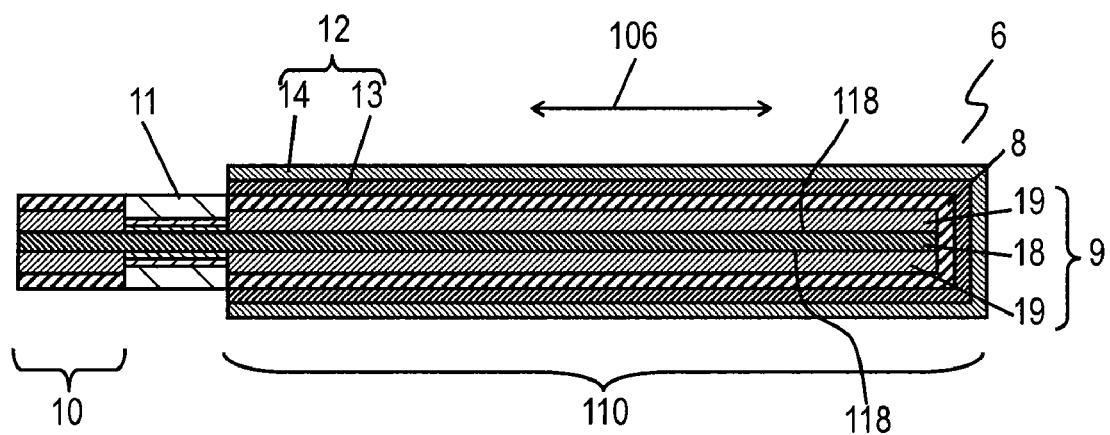
FIG. 2B is a cross sectional view of the capacitor element taken along the line 2B-2B shown in FIG. 2A.

FIG. 2A is a plan view of the capacitor element 6. FIG. 2B is a cross sectional view of the capacitor element 6 taken along the line 2B-2B of FIG. 2A. The capacitor element 6 has a plate shape extending in a longitudinal direction 106. The capacitor element 6 includes an electrode foil 9, a dielectric film 8 disposed on a surface of the electrode foil 9, and the cathode electrode 12 disposed on the dielectric film 8. The capacitor element 6 further includes a resist 11 which divides the electrode foil 9 into the anode electrode 10 and a cathode forming portion 110. The cathode electrode 12 is formed on the dielectric film 8 at the cathode forming portion 110. The electric foil 9 includes a substrate 18 and a rough layer 19 disposed on the surface 118 of the substrate 18. The resist 11 has an electrically insulating property, and presses the electrode foil 9 after the fabrication of the dielectric film 8 to partially crush the rough layer 19. The cathode electrode 12 includes a solid electrolyte layer 13 disposed on the dielectric film 8 and a cathode layer 14 disposed on the solid electrolyte layer 13. The resist 11 prevents the cathode electrode 12 from contacting the anode electrode 10. The solid electrolyte layer 13 is made of solid electrolyte, such as conductive polymer. The cathode layer 14 is an electrode which functions as a negative electrode and includes a carbon layer disposed on the solid electrolyte layer 13 and a silver paste layer disposed on the carbon layer. The cathode layer 14 faces the dielectric film 8 across the solid electrolyte layer 13 which is an electrolyte.

As shown in FIG. 2B, the electrode foil 9 includes the substrate 18 and the rough layer 19 disposed on the substrate 18. The rough layer 19 may be disposed on each of both surfaces or on only one surface of the substrate 18.

Figure 3:
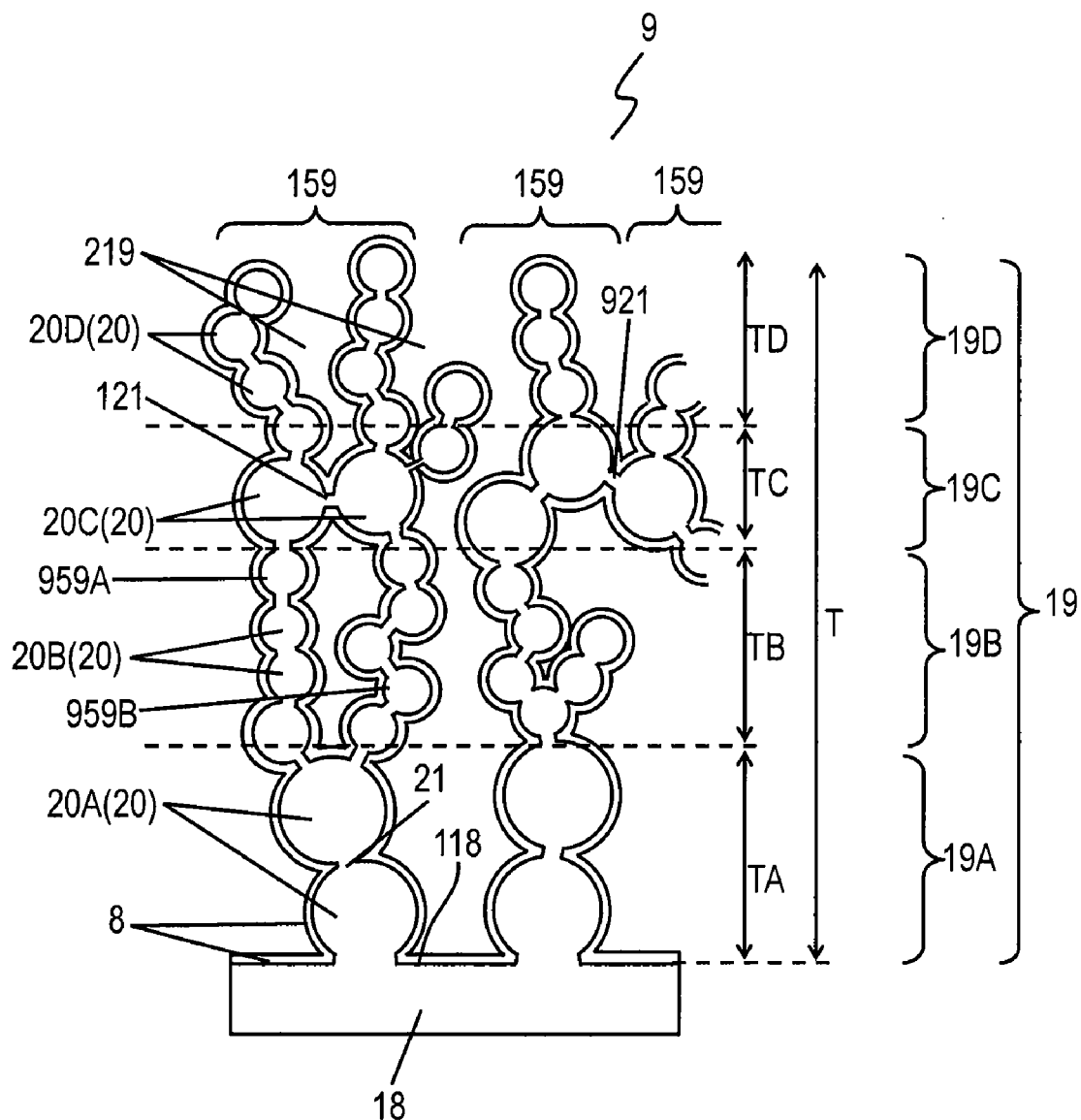
FIG. 3 is a schematic cross sectional view of an electrode foil of the capacitor element according to Embodiment 1.
Figure 4:
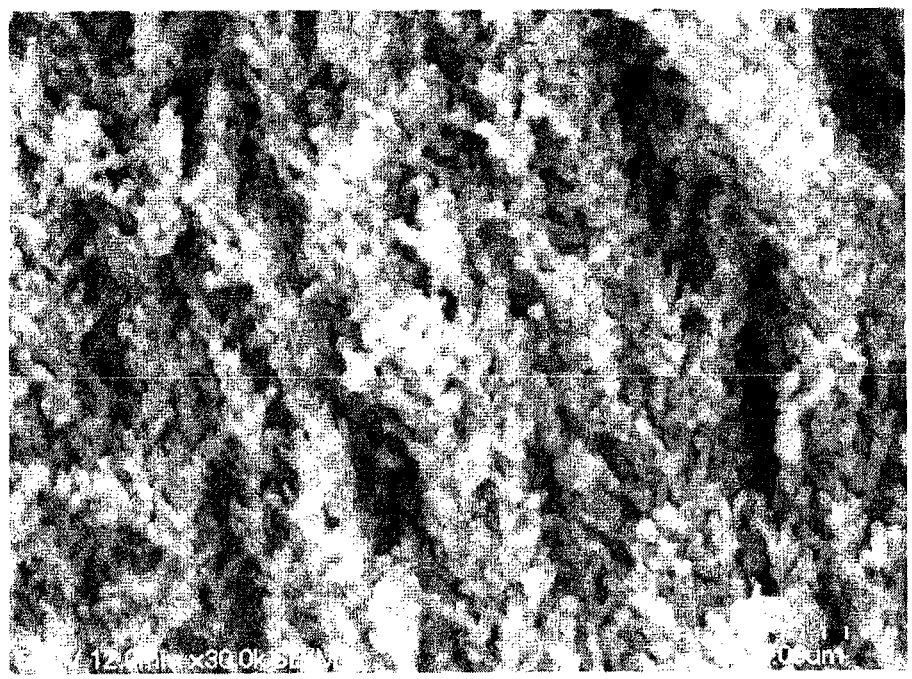
FIG. 4 is an enlarged view of the electrode foil according to Embodiment 1.

FIG. 3 is a schematic cross sectional view of the electrode foil 9. FIG. 4 is an enlarged view of the electrode foil 9. More particularly, FIG. 4 illustrates a scanning electron microscope (SEM) picture of a cross section of the electrode foil 9 taken with an SEM and enlarged at thirty thousands times. The rough layer 19 includes, as shown in FIG. 3, plural structures 159 which extend from the surface 118 of the substrate 18 and are densely located. Each of the structures 159 is branched into twigs 959A and 959B each containing plural fine metallic particles 20 irregularly joined. The fine metallic particles 20 are integrally joined with one another at joint points 21.

The rough layer 19 has a four-layer structure including an adhering layer 19A disposed on the surface 118 of the substrate 18, a lower layer 19B disposed on the adhering layer 19A, an intermediate layer 19C disposed on the lower layer 19B, and an upper layer 19D disposed on the intermediate layer 19C. The adhering layer 19A, the lower layer 19B, the intermediate layer 19C, and the upper layer 19D are distanced in this order from the surface 118 of the substrate 18. The fine metallic particles 20 includes fine particles 20A located in the adhering layer 19A, fine particles 20B located in the lower layer 19B, fine particles 20C located in the intermediate layer 19C, and fine particles 20D located in the upper layer 19D.

The rough layer 19 includes the fine metallic particles 20 joined with one another, thus forming plural structures 159 extending from the surface 118 of the substrate 18 to the upper layer 19D. In each of the structures 159, respective fine particles 20C of twigs 959A and 959B in the intermediate layer 19C adjacent to each other are joined to each other at a joint point 121. Also, respective fine particles 20C of each of some pairs of structures 159 adjacent to each other may be joined at joint point 921.

Figure 5:
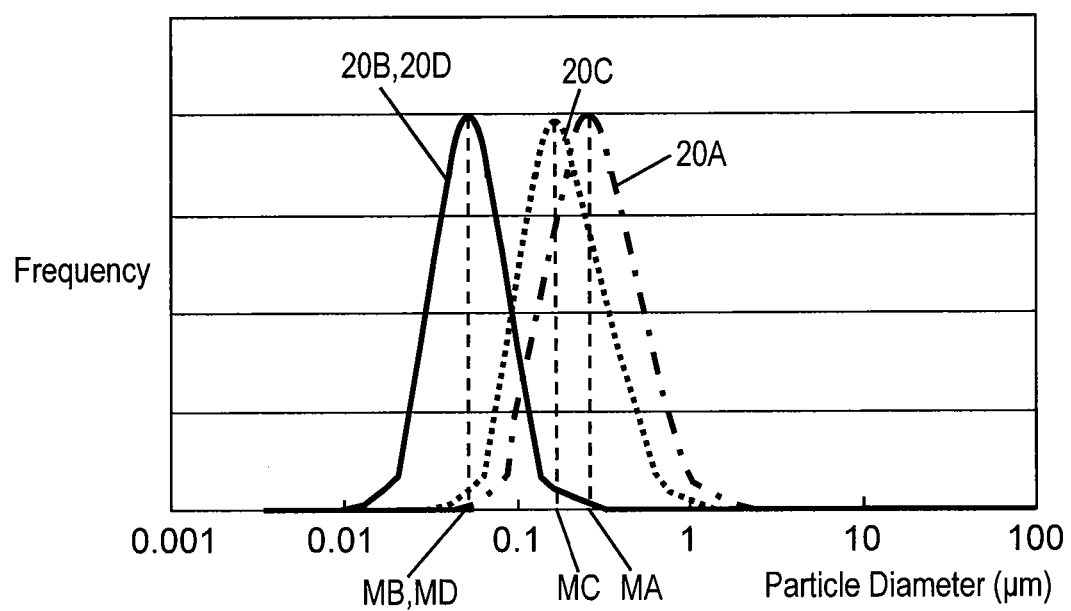
FIG. 5 shows a distribution of diameters of fine metallic particles of the electrode foil according to Embodiment 1.

FIG. 5 shows a distribution of particle diameters of the fine particles 20A to 20D of the metallic particles 20. The mode MC of particle diameters of the fine particles 20C in the intermediate layer 19C ranges from 0.1 µm to 0.3 µm. Respective modes MB and MD of particle diameters of the fine particles 20B and 20D range from 0.01 µm to 0.1 µm. The mode MC of particle diameters of the fine particles 20C is greater than the modes MB and MD of particle diameters of the fine particles 20B and 20D. In other words, the diameters of the fine particles 20C in the intermediate layer 19C are substantially greater than those of the fine particles 20B and 20D in the lower layer 19B and the upper layer 19D.

The mode MA of particle diameters of the fine particles 20A in the adhering layer 19A ranges from 0.2 µm to 0.35 µm, and is greater than the mode MC of particle diameter of the fine particles 20C in the intermediate layer 19C. At a base area of the structure 159 situated closer to the surface 118 of the substrate 18, the fine particles 20A have greater diameters so that the rough layer 19 is securely bonded to the substrate 18. This structure reduces an equivalent series resistance of capacitor 7.

The mode of the particle diameters may be calculated from the mode of diameters of voids 219 in each layer which is measured with, e.g. a mercury intrusion porosimeter.

According to Embodiment 1, the mode of diameters of the voids 219 in both the lower layer 19B and the upper layer 19D is substantially equal to the modes MB and MC of particle diameters of the fine particles 20B and 20C, ranging from 0.01 µm to 0.1 µm. As described, the voids 219 are quite small. The mode of diameters of the voids 219 is much smaller than the mode of diameters of voids in an electrode foil which is roughened by etching. Accordingly, the surface area of the electrode foil 9 can significantly be increased.

The mode of diameters of the voids 219 throughout the rough layer 19 ranges preferably from 0.01 µm to 0.35 µm. In Embodiment 1, as the voids 219 has small diameters, the particle diameters decrease and accordingly increase the capacitance. Nevertheless, the voids 219 have a certain range of the diameters, the dielectric film 8 and the solid electrolyte can be deposited easily.

In Embodiment 1, the thickness TA of the adhering layer 19A is not smaller than 10% of each of the thickness TB of the lower layer 19B and the thickness TD of the upper layer 19D and not greater than 25% of each of the thicknesses TB and TD. The thickness TC of the intermediate layer 19C is not smaller than 10% of each of the thickness TB of the lower layer 19B and the thickness TD of the upper layer 19D and not greater than 25% of each of the thicknesses TB and TD. Both the adhering layer 19A and the intermediate layer 19C have preferably smaller thicknesses than at least one of the thicknesses of the lower layer 19B and the upper layer 19D. Since the lower layer 19B and the upper layer 19D have large surface areas, the large thicknesses of the lower layer 19B and the upper layer 19D provide the capacitor element 6 with a large capacitance.

In Embodiment 1, both the thickness TA of the adhering layer 19A and the thickness TC of the intermediate layer 19C are substantially 5 µm. The thickness TB of the lower layer 19B and the thickness TD of the upper layer 19D are substantially 20 µm.

In Embodiment 1, the substrate 18 is made of aluminum foil and the fine metallic particles 20 mainly contain aluminum. As shown in FIG. 3, the surface 118 of the substrate 18 and the outer surface of the fine metallic particles 20 are covered entirely with the dielectric film 8 extending along the shape of the fine metallic particles 20. The dielectric film 8 is made of aluminum oxide which is an oxide of the metal of the material of the fine metallic particles 20.

The substrate 18 and the fine metallic particles 20 may alternatively be made of valve metal, such as titanium, niobium, tantalum or their alloy, other than aluminum. Some of the fine metallic particles 20 may be oxidized. As long as the rough layer 19 has an electrical conductivity as a whole, a very small number of the fine metallic particles 20 may be made of metal oxide.

In Embodiment 1, the substrate 18 and the fine metallic particles 20 are made of aluminum having a low melting point. The rough layer 19 may be formed by vapor deposition of the metallic material of the rough layer 19 on the surface 118 of the substrate 18. Since the material of the rough layer 19 is aluminum having a low melting point, the vapor deposition of the rough layer 19 can be conducted with high productivity. The rough layer 19 and the substrate 18 may be different from each other in the main component of the material. If the rough layer 19 and the substrate 18 are identical in the main component of the material, the substrate 18 can favorably be softened by the heat generated in the vapor deposition and securely bonded to the fine metallic particles 20 while its shape remains intact.

In Embodiment 1, the dielectric film 8 is made of aluminum oxide formed by anodizing the fine metallic particles 20 and the substrate 18 which both are made of aluminum. The dielectric film 8 may alternatively be formed by vapor depositing or sputtering oxide or nitride of metal, such as zirconium, silicon, tantalum, or niobium.

A method of producing the electrode foil 9 will be described below in detail. According to Embodiment 1, the rough layer 19 was formed by the following processes of vapor deposition with resistance heating.

(1) The substrate 18 was placed in a vapor deposition chamber and held in a vacuum atmosphere of 0.01 to 0.001 Pa.

(2) Then, the substrate 18 was exposed to an ambient gas which contained 1 part in volume of oxygen gas and 4 to 6 parts in volume of argon gas, and held under a pressure of 10 to 20 Pa.

(3) While being held under the pressure determined at process (2), the substrate 18 was heated and held at a temperature of 200 to 300° C.

(4) While maintaining the pressure and the temperature at processes (2) and (3), the adhering layer 19A having a larger average particle diameter was formed by vapor deposition in vacuum with an aluminum strip as a vapor depositing source.

(5) Then, the substrate 18 was exposed to an ambient gas which contained 1 part in volume of oxygen gas and 2 to 4 parts in volume of argon gas and thus which had the rate of argon gas smaller than that of processes (2) to (4). The pressure around the substrate 18 ranged from 20 to 30 Pa.

(6) While maintaining the pressure at process (5), the substrate 18 was heated and held at a temperature of 150 to 200° C.

(7) While maintaining the pressure and the temperature at processes (5) and (6), the lower layer 19B having a smaller average particle diameter was formed by xapor deposition in vacuum with an aluminum strip as a vapor depositing source.

(8) The substrate 18 was exposed to the ambient gas which contained 1 part in volume of oxygen gas and 4 to 6 parts in volume of argon gas and thus which had the rate of argon gas larger than that of processes (5) to (7). The pressure around the substrate 18 ranged from 10 to 20 Pa.

(9) When maintaining the pressure at process (8), the substrate 18 was heated and held at a temperature of 200 to 300° C.

(10) While maintaining the pressure and the temperature at processes (8) and (9), the intermediate layer 19C having a larger average particle diameter was formed by vapor deposition in vacuum with an aluminum strip as a vapor depositing source.

(11) Then, the substrate 18 was exposed to the ambient gas which contained 1 part in volume of oxygen gas and 2 to 4 parts in volume of argon gas. The pressure around the substrate 18 ranged from 20 to 30 Pa.

(12) When maintaining the pressure at process (11), the substrate 18 was heated and held at a temperature of 150 to 200° C.

(13) While maintaining the pressure and the temperature at processes (11) and (12), the upper layer 19D having a smaller average particle diameter was formed by vapor deposition in vacuum with an aluminum strip as a vapor depositing source.

Since the fine metallic particles 20 (the fine particles 20A to 20D) are made of the same metal and formed in one vapor deposition chamber, the borders between the adhering layer 19A, the lower layer 19B, the intermediate layer 19C, and the upper layer 19D are not clearly apparent.

According to Embodiment 1, the ratio of oxygen gas to argon gas in the ambient gas used at processes (2) to (4) and (8) to (10) for forming the adhering layer 19A and the intermediate layer 19C is smaller than that of processes (5) to (7) and (11) to (13) for forming the lower layer 19B and the upper layer 19D. Further, the pressure around the substrate 18 at processes (2) to (4) and (8) to (10) is lower than that of processes (5) to (7) and (11) to (13) for forming the lower layer 19B and the upper layer 19D. Moreover, the temperature of the substrate 18 at processes (2) to (4) and (8) to (10) is higher than that of processes (5) to (7) and (11) to (13) for forming the lower layer 19B and the upper layer 19D. These conditions are changed as described above to increase both the kinetic energy and the activity at the surfaces of the fine metallic particles 20. This facilitates the growth of the fine metallic particles 20 in gaseous phase on the surface 118 of the substrate 18. As the result, the sizes of the fine particles 20A and 20C in the adhering layer 19A and the intermediate layer 19C can be greater than those in the lower layer 19B and the upper layer 19D. Alternatively, the fine metallic particles 20 can be grown up by increasing the vaporization of the metal material. The vaporized amount of the metal material is increased when the supply of the strip of aluminum to the vapor depositing source becomes large or when the power of the vapor depositing source becomes high.

As shown in FIG. 3, the fine metallic particles 20 are joined to one another throughout the adhering layer 19A, the lower layer 19B, the intermediate layer 19C, and the upper layer 19D. Accordingly, the joint points 21 exist in a cross section of the tough layer 19 along a direction vertical to the surface 118 of the substrate 18, that is, the direction in which the adhering layer 19A, the lower layer 19B, the intermediate layer 19C, and the upper layer 19D are stacked. This structure may disturb the measurement of the particle diameter of the fine metallic particles 20. In this case, the SEM picture of the cross section of the rough layer 19 which is parallel to the surface 118 of the substrate 18 can be subjected to image processing, thereby measuring the average particle diameter of the fine metallic particles 20 easily.

Alternatively, at processes (2) and (8), the vapor deposition may be carried out without the introducing of the ambient gas.

The conditions, such as the ratio of oxygen gas and argon gas, the temperature of the substrate 18, and the pressure around the substrate 18 may be changed step by step during each process. This can change the particle diameter in each of, for example, the lower layer 19B and the upper layer 19D.

In Embodiment 1, the thickness T of the rough layer 19 ranges from 20 μm to 80 μm on one surface of the substrate 18, and the rough layers 19 are disposed on both surfaces of the substrate 18. The rough layer 19 may be provided on only one surface of the substrate 18. The thickness T of the rough layer 19 not smaller than 20 μm provides the capacitor 7 with a large capacitance. The thickness T not greater than 80 μm allows the rough layer 19 to be developed precisely by the vapor depositing according to Embodiment 1.

In Embodiment 1, after the rough layer 19 was deposited by the above described processes, the electrode foil 9 was immersed into an anodizing solution and subjected to an anodizing to form the dielectric film 8.

Samples of the electrode foil 9 of the embodiment were fabricated in the above described processes. After the rough layer 19 was formed, the electrode foil 9 was immersed into an anodizing solution of 7% adipic acid water solution at a temperature of 70° C. and anodized under the conditions of an anodizing voltage of 5V, a holding time of 20 minutes, and a current density of 0.05 A/cm$^2$. The thickness of the dielectric film 8 of the example was about 0.01 μm.

Figure 11:
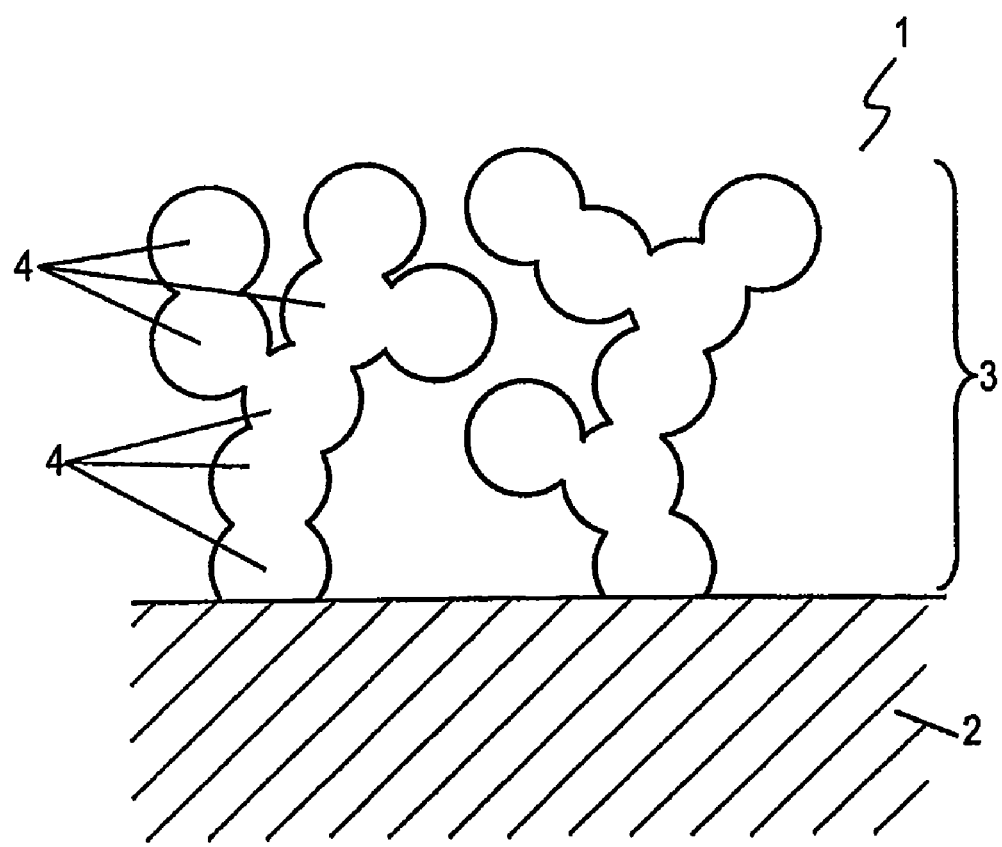
FIG. 11 is a schematic cross sectional view of an electrode foil of a conventional capacitor.

A comparative example of the conventional electrode foil 1 shown in FIG. 11 was fabricated. The rough layer 3 of the electrode foil 1 had a single-layer structure including the fine metallic particles 4 having particle diameters similar to each other. The mode of particle diameters of the fine metallic particles 4 in the rough layer 3 of the electrode foil 1 was almost equal to that of the fine metallic particles 20B in the lower layer 19B of the electrode foil 9 of the example of the embodiment. The thickness of the rough layer 3 of the comparative example was almost equal to that of the rough layer 19 of the example of the embodiment. Moreover, a dielectric film having the same thickness as that of example of the embodiment was deposited on a surface of the fine metallic particles 4 and the surface of the substrate 2 in the electrode foil 1 of the comparative example by the same process as of forming the dielectric film 8 in the example of the embodiment.

Figures 6, 7:
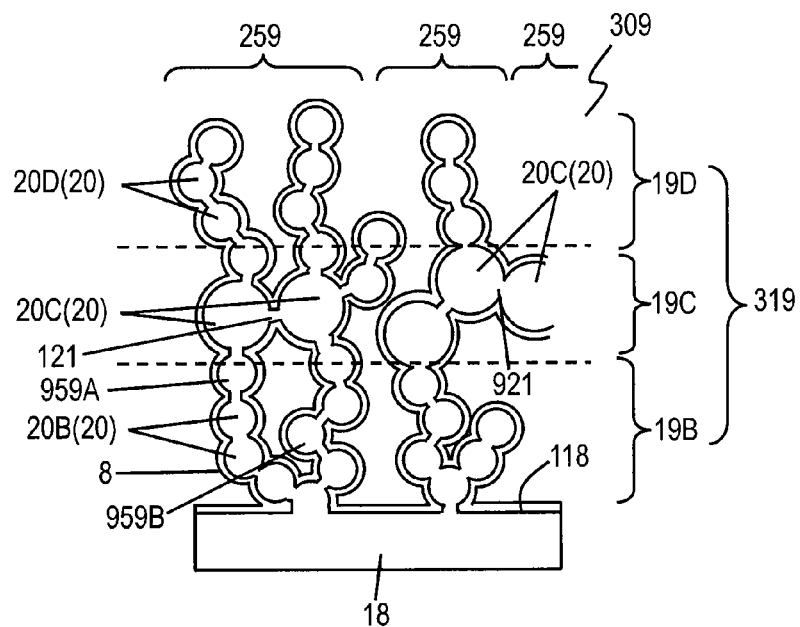
FIG. 6 shows characteristics of the electrode foil according to Embodiment 1.
FIG. 7 is a schematic cross sectional view of another electrode foil according to Embodiment 1.

FIG. 6 shows evaluation results of the electrode foil 9 of the example of the embodiment and the electrode foil 1 of the comparative example. FIG. 6 illustrates, more specifically, the capacitance of the electrode foils 1 and 9 and a crack-generating rate in the rough layers 3 and 19. When the electrode foils having an area of 10 cm$^2$ were immersed into an 8% ammonium borate water solution at a temperature of 30° C., the capacitance was measured at a frequency of 120 Hz with an impedance analyzer. It was also examined by a flexing resistance test (conforming to JIS K5600-5-1) with cylindrical mandrel technique whether or not the rough layers 3 and 19 produced some cracks. The crack-generating rate is the ratio of the number of samples having cracks generating therein to the total number of the samples of each of the electrode foils 1 and 9.

As shown in FIG. 6, 50% of the samples of the comparative example had cracks generating in the rough layer 3. However, the example of the electrode foil 9 of Embodiment 1 did not have a crack. As a result, the capacitor 7 including the electrode foil 9 of Embodiment 1 can reduce a leakage current at the electrode foil 9.

Since the conventional example of the electrode foil 1 shown in FIG. 11 includes the rough layer 3 with a small mechanical strength, the current leakage at the electrode foil 1 may become large. The rough layer 3 includes plural structures composed of the fine metallic particles 4 which extend from the surface of the substrate 2. Accordingly, any two adjacent structures do not have preferable lateral network, and do have a small mechanical joining strength, accordingly generating cracks easily due to an external stress. The cracks expose metallic surfaces of the fine metallic particles 4 from the dielectric film, and create electrical paths between the anode and the cathode, hence increasing the leakage of current at the electrode foil 1.

On the other hand, the rough layer 19 in the electrode foil 9 of Embodiment 1 has a mechanical strength improved. More specifically, the rough layer 19 has the fine particles 20C in the intermediate layer 19C having larger particle diameters, as shown in FIG. 3, so that respective fine particles 20C of twigs 959A and 959B adjacent to each other in one structure 159 can be easily joined to each other at the joint point 121. This structure increases a lateral network, i.e., a mechanical joining strength between two adjacent twigs 959A and 959B of one structure 159. Also, some of structures 159 adjacent to each other are easily joined at a joint point 921. This structure increases the lateral network, i.e., a mechanical joining strength between structures 159 adjacent to each other. This structure causes an external stress to disperse, and prevents the rough layer 19 from having cracks therein, accordingly reducing the leakage of current in the electrode foil 9.

The capacitor 7 including the solid electrolyte layer 13 made of conductive polymer used as the electrolyte has no function of repairing the dielectric film 8 even if the metallic particle 20 in the rough layer 19 is exposed at the surface due to cracks. The leakage of current at the electrode foil 9 can be avoided by suppressing g the generation of cracks in the rough layer 19, thus providing the capacitor 7 with a high withstanding voltage.

As shown in FIG. 6, the samples of the example of the electrode foil 9 of the embodiment had 95% of the capacitance (100%) of the comparative example of the electrode foil 1. It is apparent that the capacitor 7 with the electrode foil 9 of Embodiment 1 maintains its large capacitance. Since the fine particles 20C in the intermediate layer 19C have large particle diameters, accordingly being prevented from contributing to the increase of the capacitance of the capacitor 7. However, both the lower layer 19B and the upper layer 19D including fine particles 20B and 20D having small particle diameters are disposed on both, upper and lower, surfaces of the intermediate layer 19C. In addition, the thickness TC of the intermediate layer 19C is smaller than the thickness TB of the lower layer 19B and the thickness TD of the upper layer 19D. The intermediate layer 19C including fine particles 20C having large diameters is extremely thin. Therefore, the electrode foil of the example of the embodiment is substantially equal in the capacitance to the comparative example including the rough layer containing only the fine particles 20B and 20D which are as small as the fine metallic particles 4.

In order to ensure a large capacitance, the thickness TC of the intermediate layer 19C may be preferably smaller than the su m of the thickness TB of the lower layer 19B and the thickness TD of the upper layer 19D.

Moreover, in the electrode foil 9 of Embodiment 1, the mode MC of particle diameters of the fine particles 20C in the intermediate layer 19C is smaller than the mode MA of particle diameters of the fine particles 20A in the adhering layer 19A. This arrangement provides the capacitor 7 with a small equivalent series resistance. More particularly, if the fine particles 20C of the intermediate layer 19C have excessively large diameters, the intermediate layer 19C prevents the solid electrolyte layer from being formed directly on the fine particles 20A and 20B of adhering layer 19A and the lower layer 19B beneath the intermediate layer 19C without gaps. As a result, the equivalent series resistance becomes large. Therefore, the fine particles 20C in the intermediate layer 19C are designed to have an appropriate diameter. On the other hand, since the adhering layer 19A is disposed on the surface 118 of the substrate 18, fine particles 20A do not increase the equivalent series resistance even if having a large diameter. Rather, the fine particles 20A having a large diameter increase the bonding strength between the adhering layer 19A and the substrate 18, hence decreasing the equivalent series resistance.

In the rough layer 19, any two adjacent fine particles 20C are joined to each other at the joint point 121, thus increasing the mechanical strength of the structure 159. At the joint point 921, the joining between the two adjacent fine particles 20C contributes to the increase of the mechanical joining strength between the two structures 159 adjacent to each other. In case that most of pairs of the fine particles 20C in the two adjacent structures 159 are joined to each other at the joint points 921, the rough layer 19 may hardly be impregnated with the solid electrolyte. Accordingly, the two adjacent fine particles 20C are to be joined to each other mainly at the joint point 121 rather than at the joint point 921.

As set forth above, the electrode foil 9 includes the substrate 18 made of metal and the rough layer 19 including the fine metallic particles 20 and disposed on the surface 118 of the substrate 18. The intermediate layer 19C is more distanced from the substrate 18 than the lower layer 19B is, and is disposed on the lower layer 19B. The upper layer 19D is more distanced from the substrate 18 than the intermediate layer 19C is, and is disposed on the intermediate layer 19C. The fine metallic particles 20 include the fine particles 20B in the lower layer 19B, the fine particles 20C in the intermediate layer 19C, and the fine particles 20D in the upper layer 19D. The mode MC of the diameters of the fine particles 20C is greater than the modes MB and MD of the diameters of the fine particles 20B and 20D. The rough layer 19 further may include the adhering layer 19A attached to the surface 118 of the substrate 18. The fine metallic particles 20 further include the fine particles 20A in the adhering layer 19A. The mode MA of the diameters of the fine particles 20A is greater than the mode MC of the diameters of the fine particles 20C. The thickness TC of the intermediate layer 19C is smaller than the thickness TB of the lower layer 19B. The thickness TC of the intermediate layer 19C is smaller than the thickness TD of the upper layer 19D.

The rough layer 19 in the electrode foil 9 is designed such that the mode of particle diameters of the fine particles 20A in the adhering layer 19A is different from that of the fine particles 20B in the lower layer 19B. Thus, rough layer 19 has a four-layer structure. The rough layer according to Embodiment 1 may have another layer structure including at least the combination of the lower layer 19B, the intermediate layer 19C, and the upper layer 19D stacked.

FIG. 7 is a schematic cross sectional view of another electrode foil 309 according to Embodiment 1. In FIG. 7, components identical to those of the electrode foil 9 shown in FIG. 3 are denoted by the same reference numerals. The electrode foil 309 includes a rough layer 319 instead of the rough layer 19 in the electrode foil 9. The rough layer 319 does not include the adhering layer 19A shown in FIG. 3, thus having a three-layer structure. The lower layer 19B is disposed directly on the surface 118 of the substrate 18. The rough layer 319 includes plural structures 259 instead of the structures 159 in the rough layer 19 shown in FIG. 3. In each of the structures 259, any two adjacent fine particles 20C of twigs 959A and 959B in the intermediate layer 19C are joined to each other at a joint point 121. Also, two fine particles 20C in any two adjacent structures 259 may be joined to each other at a joint point 921. The fine particles 20C of the intermediate layer 19C in the electrode foil 309 have a large diameter, similarly to the electrode foil 9. Therefore, the fine particles 20C at any two adjacent twigs 959A and 959B of the intermediate layer 19C in the structure 259 are likely to join with each other at the joint point 121 easily. This enhances the lateral network or increases the mechanical joining strength between the two adjacent twigs 959A and 959B, hence increasing the physical strength of the structure 259. Similarly, any two adjacent fine particles 20C in structures 259 are likely to join with each other at the joint point 921 easily. This enhances the lateral network or increases the mechanical joining strength between the two adjacent structures 259. Accordingly, the rough layer 319 can be protected from the generation of cracks by dispersing any external stress, and decreases the leakage of a current from the electrode foil 309.

Figure 8:
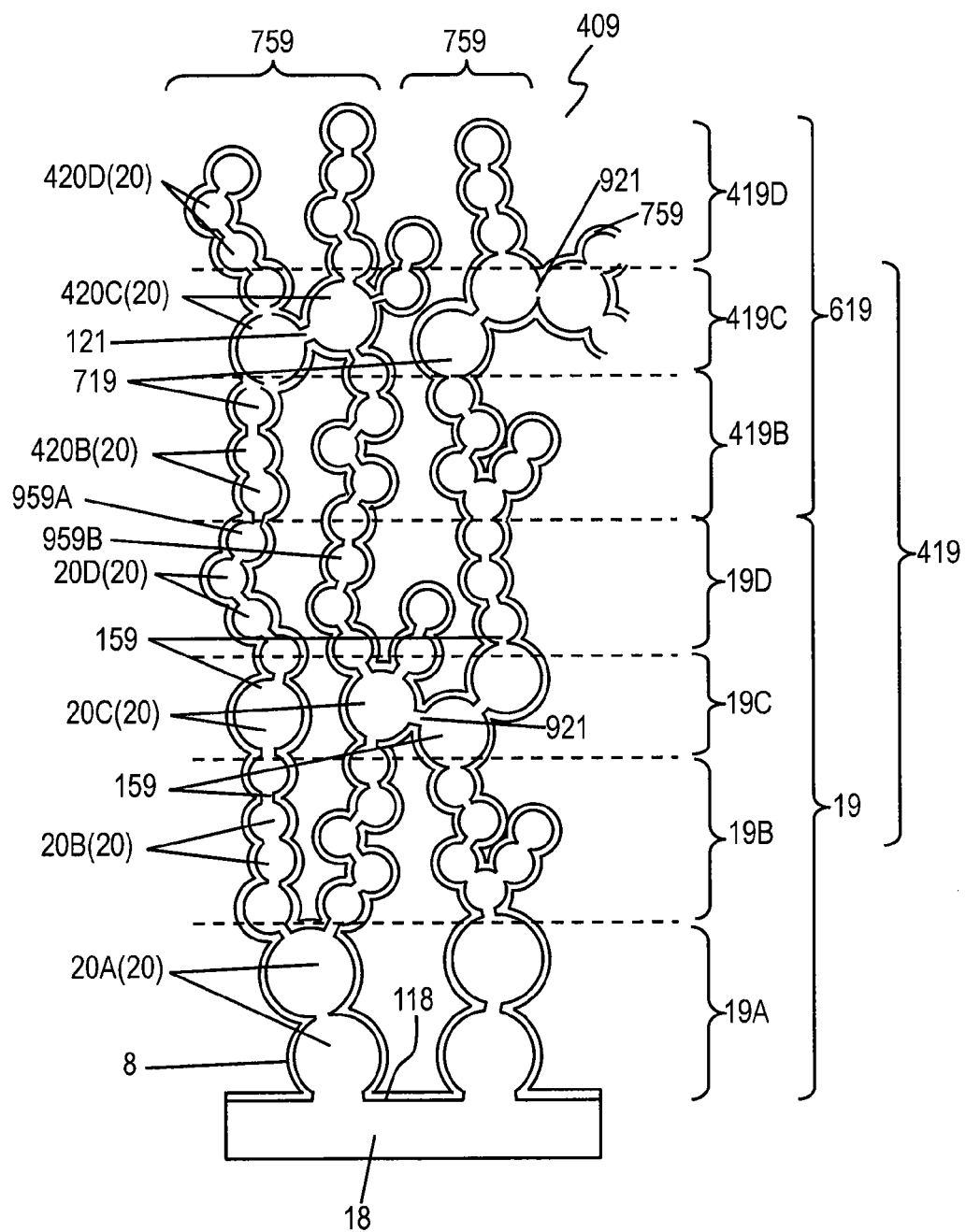
FIG. 8 is a schematic cross sectional view of still another electrode foil according to Embodiment 1.

FIG. 8 is a schematic cross sectional view of a further electrode foil 409 according to Embodiment 1. In FIG. 8, components identical to those of the electrode foil 9 shown in FIG. 3 are denoted by the same reference numerals. The electrode foil 409 includes a rough layer 419 instead of the rough layer 19 of the electrode foil 9 shown in FIG. 3. The rough layer 419 includes an additional rough layer 619 disposed on the upper layer 19D of the rough layer 19. The additional rough layer 619 includes a lower layer 419B, an intermediate layer 419C, and an upper layer 419D which are identical in construction to the lower layer 19B, the intermediate layer 19C, and the upper layer 19D of the rough layer 19, respectively. The fine metallic particles 20 further include fine particles 420B, 420C, and 420D which are located in the lower layer 419B, the intermediate layer 419C, and the upper layer 419D of the additional rough layer 619, respectively. The lower layer 419B is more distanced from the substrate 18 than the upper layer 19D is, and is disposed on the upper layer 19D. The intermediate layer 419C is more distanced from the substrate 18 than the lower layer 419B is, and is disposed on the lower layer 419B. The upper layer 419D is more distanced from the substrate 418 than the intermediate layer 419C is, and is disposed on the intermediate layer 419C. The lower layer 419B, the intermediate layer 419C, and the upper layer 419D include fine particles 420B, fine particles 420C, and fine particles 420D which are equal in material and particle diameter to the fine particles 20B, fine particles 20C, and fine particles 20D of the lower layer 19B, the intermediate layer 19C, and the upper layer 19D, respectively. The fine particles 420B, 420C, and 420D constitute a partial structure 719 which extends from the fine particle 20D. The structure 159 and the partial structure 719 include a structure 759 which extends from the surface 118 of the substrate 18. In the electrode foil 409, the fine particles 20C and 420C in the intermediate layers 19C and 419C have a larger diameter. Thereby, the fine particles 420C in any two adjacent twigs 959A and 959B in the structures 759 are likely to join with each other at the joint point 121 easily. Similarly, any two adjacent fine particles 20C in their respective structures 959A and 959B in the structure 759 are likely to join with each other easily. More particularly, the two adjacent twigs 959A and 959B in at least either of the two intermediate layers 19C and 419C are joined to each other. This enhances the lateral network or increases the mechanical joining strength between the two adjacent twigs 959A and 959B, hence increasing the physical strength of the structures 759. Moreover, the fine particles 420C in any two adjacent structures 759 are likely to join with each other at a joint point 921 easily. Similarly, the fine particles 20C in any two adjacent structures 759 are likely to join with each other at the joint point 921 easily. This enhances the lateral network or increases the mechanical joining strength between the two adjacent structures 759. Accordingly, the rough layer 319 can be protected from the generation of cracks by dispersing any external stress, and can decrease a leakage current from the electrode foil 409. As set forth above, some of the metallic particles 20 having larger diameter are sandwiched between other particles having smaller diameters so that the rough layer have a large mechanical strength and a large thickness.

The lower layer 419B in the additional rough layer 619 and the upper layer 19C in the rough layer 19 may be provided as two separate layers. Since the lower layer 419B in the additional rough layer 619 and the upper layer 19C in the rough layer 19 are composed mainly of the fine particles 420B and 20D, respectively, which are equal in material and diameter, they may be provided actually as one common layer.

Exemplary Embodiment 2

Figure 9:
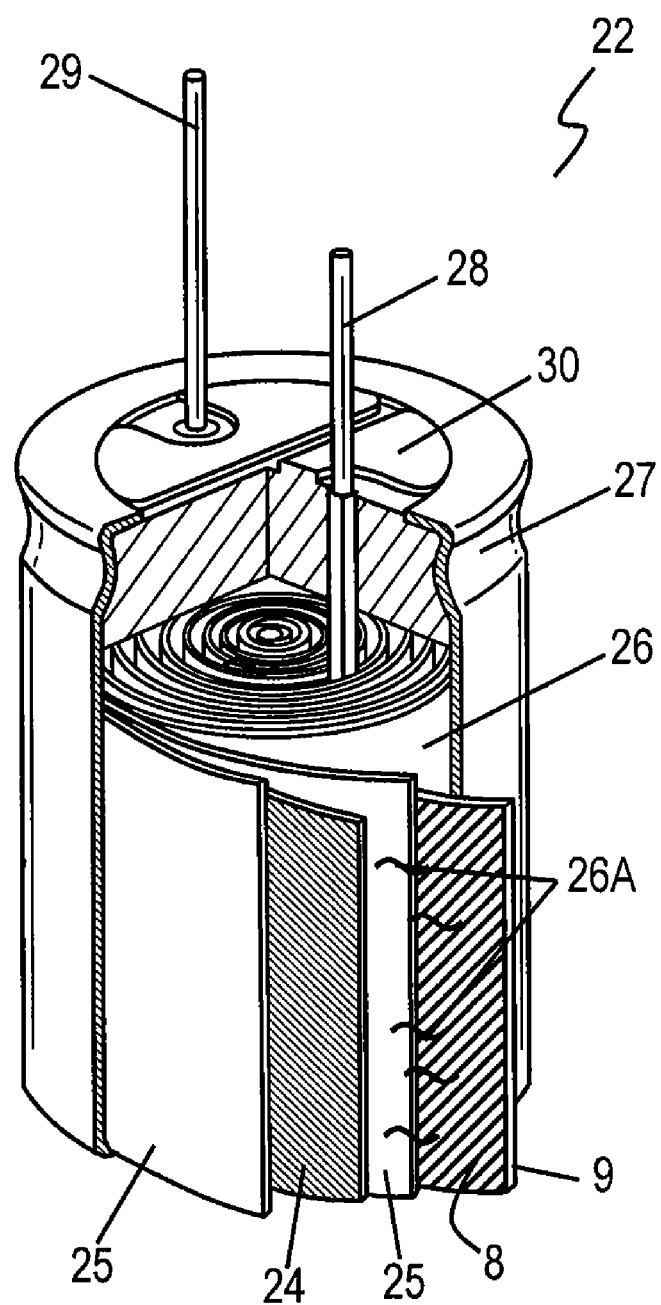
FIG. 9 is an exploded perspective view of a capacitor according to Exemplary Embodiment 2 of the invention.

FIG. 9 is an exploded perspective view of a capacitor 22 according to Exemplary Embodiment 2 of the present invention. The capacitor 22 is an electrolytic capacitor including a conductive electrolytic solution as the electrolyte instead of the solid electrolyte of the capacitor 7 shown in FIGS. 1, 2A, and 2B.

The capacitor 22 includes a capacitor element 26, an electrolytic solution 26A, and case 27 accommodating the capacitor element 26 and the electrolytic solution 26A therein. The capacitor element 26 is connected with an anode lead terminal 28 and a cathode lead terminal 29. The case 27 has an opening thereof sealed with a sealing member 30 made of a rubber material. The anode lead terminal 28 and the cathode lead terminal 29 are inserted through the sealing member 30 and have respective one ends exposed to the outside of the case 27.

The capacitor element 26 includes an electrode foil 9 according to Embodiment 1, a dielectric film 8 disposed on the electrode foil 9, an electrode foil 24, and a separator 25 provided between the dielectric film 8 and the electrode foil 24. The electrode foil 9, the dielectric film 8, the electrode foil 24, and the separator 25 are rolled together. The separator 25 is impregnated with the electrolytic solution 26A which contact the dielectric film 8 and the electrode foil 24. The electrode foil 9 serves as an anode. The electrode foil 24 is an electrode serving as a cathode. The electrode foil 9 may be identical to the electrode foil 309 or 409 shown in FIGS. 7 and 8. The electrode foil 24 faces the dielectric film 8 across the electrolytic solution 26A which is an electrolyte.

The dielectric film 8 and the rough layer 19 of the electrode foil 9 are partially cut off thus to expose a portion of the surface 118 of the substrate 18. The exposed portion of the surface 118 of the substrate 18 is connected with the anode lead terminal 28. The electrode foil 24 is connected to the cathode lead terminal 29.

In Embodiment 2, the electrode foil 24 serving as the cathode may be made of etched aluminum foil. The electrolytic solution 26A may be acetic acid, oxalic acid, or formic acid. The separator 25 may be made of cellulose fiber, such as Manila hemp, craft paper, hemp, or esparto.

In the capacitor 22 of Embodiment 1 like the capacitor 7 of Embodiment 1, the rough layer 19 of the electrode foil 9 has a large mechanical strength. More specifically in the rough layer 19, the fine particles 20C in the intermediate layer 19C have a large diameter as illustrated in FIG. 3. Hence, any two adjacent fine particles 20C are likely to join with each other easily. This enhances the lateral network or increases the mechanical bonding strength between any two adjacent twigs 959A and 959B in each structure 159, hence increasing the physical strength of the structure 159. Also, this enhances the lateral network or increases the mechanical bonding strength of any two adjacent structures 159. Accordingly, the rough layer 19 can be protected from the generation of cracks by dispersing any external stress, and decreases a leakage current from the electrode foil 9.

The capacitor element 26 in the capacitor 22 of Embodiment 2 is of a roll type. Alternatively, the capacitor element according to Embodiment 2 may be a lamination type of capacitor element where the electrode foil 9, the separator 25, and the electrode foil 24 are not rolled but simply stacked one over another. In the capacitor 22 of Embodiment 2 , the electrolytic solution 26A may be replaced by a solid electrolyte, such as that of the capacitor 7 of Embodiment 1. The solid electrolyte is disposed on the dielectric film 8. The capacitor of Embodiment 2 may be include both the solid electrolyte and the electrolytic solution 26A.

Exemplary Embodiment 3

Figure 10A:
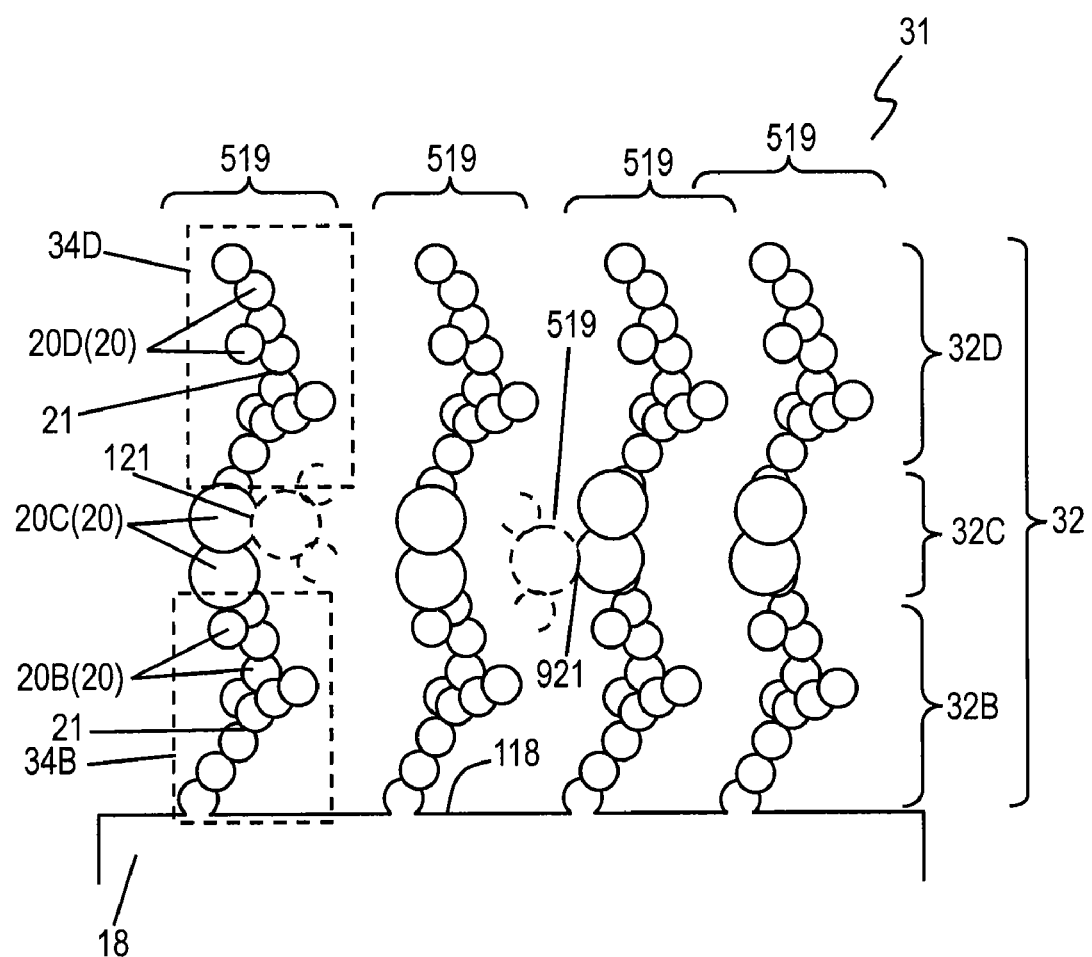
FIG. 10A is a schematic cross sectional view of an electrode foil according to Exemplary Embodiment 3 of the invention.

FIG. 10A is a schematic cross sectional view of an electrode foil 31 according to Embodiment 3 of the present invention. In FIG. 10A, components identical to those of the electrode foil 309 of Embodiment 1 shown in FIG. 7 are denoted by the same reference numerals. The electrode foil 31 includes a rough layer 32 instead of the rough layer 319 of the electrode foil 309, and is disposed on the surface 118 of a substrate 18. The rough layer 32 includes a lower layer 32B disposed on the surface 118 of the substrate 18, an intermediate layer 32C disposed on the lower layer 32B, and an upper layer 32D disposed on the intermediate layer 32C. The lower layer 32B, the intermediate layer 32C, and the upper layer 32D are distanced in this order from the surface 118 of the substrate 18. The rough layer 32 includes plural closely developed structures 519 which extend from the surface 118 of the substrate 18 as shown in FIG. 10A. Each of the structures 519 includes plural fine metallic particles 20 joined to one another. Some of the fine metallic particles 20 are joined together at a joint point 21. The fine metallic particles 20 include fine particles 20B in the lower layer 32B, fine particles 20C in the intermediate layer 32C, and fine particles 20D in the upper layer 32D. The fine particles 20D in the upper layer 32D are joined with one another thus to develop a partial structure 34D of a pillar shape which extends away from the surface 118 of the substrate 18 while curving. The fine particles 20B in the lower layer 32B are joined with one another thus to develop a partial structure 34B of a pillar shape which extends away from the surface 118 of the substrate 18 while curving.

The partial structure 34D of the upper layer 32D and the partial structure 34B of the lower layer 32B curve in the same direction and extend in parallel to each other. As both the partial structures 34B and 34D extend in curve, the fine metallic particles 20 can be provided more per unit space or at a higher density in the rough layer 32, hence increasing the capacitance of the capacitor.

The modes MB, MC, and MD of diameters of the fine particles 20B, 20C, and 20D in the lower layer 32B, the intermediate layer 32C, and the upper layer 32D are equal to the modes MB, MC, and MD of diameter of the fine particles 20B, 20C, and 20D in the lower layer 19B, the intermediate layer 19C, and the upper layer 19D according to Embodiment 1, respectively. More specifically, the mode MC of diameters of the fine particles 20C in the intermediate layer 32C is greater than either the modes MB and MD of diameters of the fine particles 20B and 20D in the lower layer 32B and the upper layer 32D.

In the case that the upper layer 32D of the partial structure 34D which extends in curve is developed directly on the lower layer 32B of the partial structure 34B which extends in curve, partial structures 34B and 34D join with each other at the interface between the layers 32B and 32D. This prevents the upper layer 32D and the lower layer 32B from securely joining with each other. The intermediate layer 32C including fine particles 20C having a large diameter having a comparatively low curvature and a large surface area. Therefore, both the lower layer 32B and the upper layer 32D can be joined securely with the intermediate layer 32C, hence preventing the increase of the leakage of current and the decrease of the capacitance.

In the rough layer 32, the fine particles 20C in the intermediate layer 32C have a large diameter, as shown in FIG. 10A. This allows any two adjacent fine particles 20C in the structure 519 to join with each other at the joint point 121 easily, and any two adjacent structures 519 to join with each other at a joint point 921 easily, accordingly increasing the physical strength of the structures 519. Also, any two adjacent structures 519 can be enhanced in the lateral network or increased in the mechanical bonding strength. Thereby, the rough layer 32 can be protected from the generation of cracks by dispersing any external stress, hence decreasing the leakage of current at the electrode foil 31.

Figure 10B:
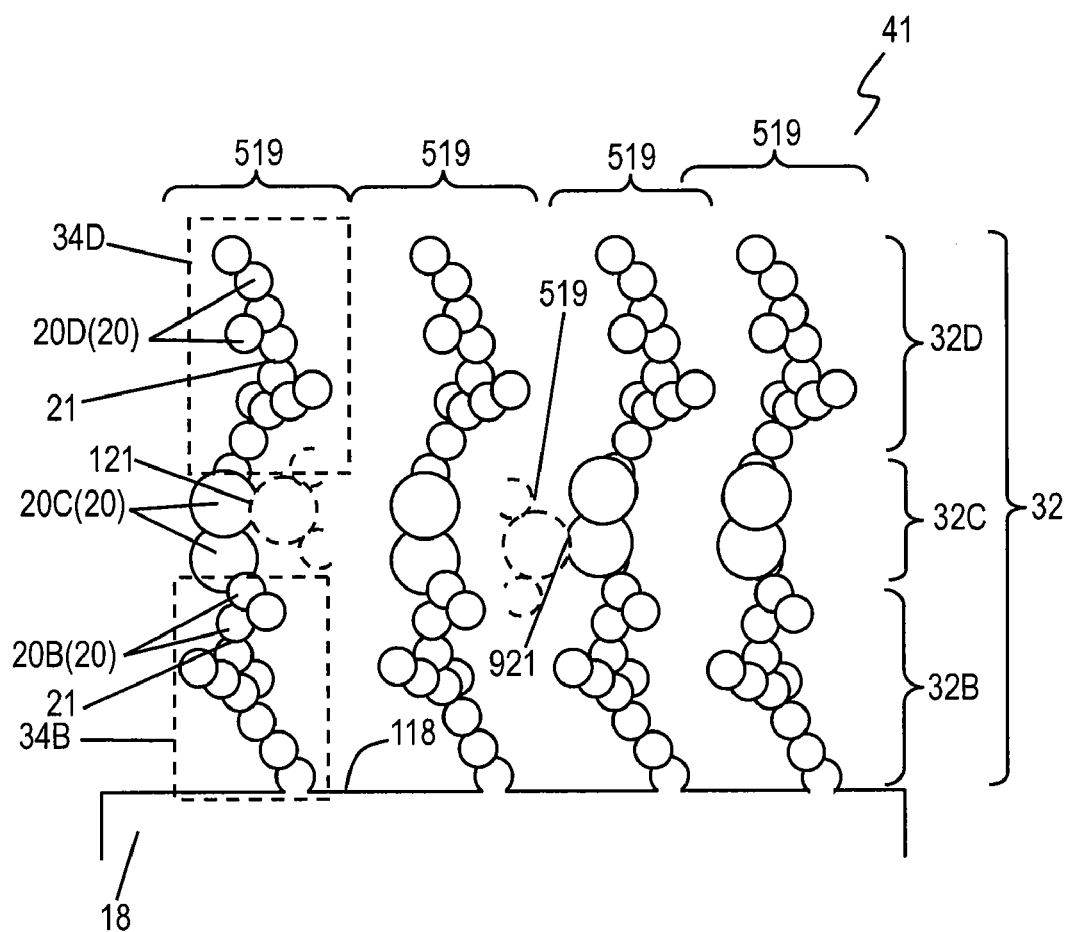
FIG. 10B is a schematic cross sectional view of another electrode foil according to Embodiment 3.

FIG. 10B is a schematic cross sectional view of another electrode foil 41 according to Embodiment 3. In FIG. 10B, components identical to those of the electrode foil 31 shown in FIG. 10A are denoted by the same reference numerals. The electrode foil 41 has a partial structure 34D of upper layer 32D and a partial structure 34B of its lower layer 32B arranged to curve in opposite directions. As both the partial structures 34B and 34D extend in curve, fine metallic particles 20 can be provided more per unit space or at a higher density in the rough layer 32, hence increasing the capacitance of the capacitor. Also, since the fine particles 20C in the intermediate layer 32C has a large size, the rough layer 32 similar to that in the electrode foil 31 shown in FIG. 10A can be protected from the generation of cracks by dispersing any external stress, hence decreasing the leakage of current at the electrode foil 41.

As set forth above, the lower layer 32B includes plural the partial structures 34B. The partial structure 34B includes plural fine particles 20B joined with one another to develop a pillar shape which extends away from the surface 118 of the substrate 18 while curving. The upper layer 32D includes plural partial structures 34D. The partial structure 34D includes plural fine particles 20D joined with one another to develop a pillar shape which extends away from the surface 118 of the substrate 18 while curving.

The electrode foils 9, 31, 41, 309, and 409 according to Embodiments 1 to 3 are utilized as electrode foils in capacitors and also applicable to any other devices than the capacitors. For example, if dielectric film 8 is made of titanium dioxide, the electrode foil may be applied to a deodorant device utilizing the effect of photo-catalysis of titanium dioxide. In this case, the rough layers 19, 32, 319, and 419 having a large surface area and a high mechanical strength provide the deodorant good with high deodorant function and high reliability.

INDUSTRIAL APPLICABILITY

An electrode foil according to the present invention provides a capacitor having a small leakage current. The electrode foil has a large mechanical strength and can hence be applied to any relevant product having a high reliability.

REFERENCE MARKS IN THE DRAWINGS 7 capacitor
8 dielectric film
9 electrode foil
13 solid electrolyte layer (electrolyte)
14 cathode layer (electrode)
18 substrate
19 rough layer
19A adhering layer
19B lower layer
19C intermediate layer
19D upper layer
20 fine metallic particle
20A fine particle (fourth particle)
20B fine particle (first particle)
20C fine particle (second particle)
20D fine particle (third particle)
22 capacitor
24 electrode foil (electrode)
26A electrolytic solution (electrolyte)
32B lower layer
32C intermediate layer
32D upper layer
34B partial structure (first partial structure)
34D partial structure (second partial structure)

The invention claimed is:

1. An electrode foil comprising:
a substrate made of metal; and
a rough layer disposed on a surface of the substrate, the rough layer including a plurality of fine metallic particles, the rough layer including
a lower layer;
an intermediate layer disposed on the lower layer, wherein the intermediate layer is more distanced from the substrate than the lower layer is, and
an upper layer disposed on the intermediate layer, wherein the upper layer is more distanced from the substrate than the intermediate layer is,
wherein the plurality of fine metallic particles include:
first fine particles located in the lower layer;
second fine particles located in the intermediate layer; and
third fine particles located in the upper layer, and
wherein a mode of diameters of the second fine particles is greater than a mode of diameters of the first fine particles and a mode of diameters of the third fine particles.

2. The electrode foil according to claim 1,
wherein the rough layer further comprises an adhering layer attached to the surface of the substrate,
wherein the plurality of fine metallic particles further include fourth fine particles located in the adhering layer, and
wherein a mode of diameter of the fourth fine particles is greater than the mode of the diameters of the second fine particles.

3. The electrode foil according to claim 1, wherein a thickness of the intermediate layer is smaller than a thickness of the lower layer.

4. The electrode foil according to claim 1, wherein a thickness of the intermediate layer is smaller than a thickness of the upper layer.

5. The electrode foil according to claim 1,
wherein the lower layer includes a plurality of first partial structures, each of the first partial structures including the first fine particles joined with one another to form a pillar shape extending away from the surface of the substrate while curving, and
wherein the upper layer includes a plurality of second partial structures, each of the second partial structures having the third fine particles joined with one another to form a pillar shape extending away from the surface of the substrate while curving.

6. The electrode foil according to claim 1, wherein the rough layer including a plurality of structures, each of the structures having the fine metallic particles joined with one another and extending from the surface of the substrate to the upper layer.

7. A capacitor comprising:
an electrode foil including
a substrate made of metal, and
a rough layer disposed on a surface of the substrate, the rough layer including a plurality of fine metallic particles;
a dielectric film disposed on the rough layer;
an electrolyte disposed on the dielectric film; and
an electrode facing the dielectric film across the electrolyte, the rough layer including
a lower layer;
an intermediate layer disposed on the lower layer, wherein the intermediate layer is more distanced from the substrate than the lower layer is, and
an upper layer disposed on the intermediate layer, wherein the upper layer is more distanced from the substrate than the intermediate layer is,
wherein the plurality of fine metallic particles include:
first fine particles located in the lower layer;
second fine particles located in the intermediate layer; and
third fine particles located in the upper layer, and
wherein a mode of diameters of the second fine particles is greater than a mode of diameters of the first fine particles and a mode of diameters of the third fine particles.

8. The capacitor according to claim 7, further comprising a separator disposed between the electrode foil and the electrode,
wherein the electrolyte is an electrolytic solution impregnating the separator and contacting the dielectric film and the electrode.

* * * * *